United States Patent [19]

Djololian et al.

[11] 4,308,039
[45] Dec. 29, 1981

[54] METHOD AND APPARATUS FOR THE TREATMENT OF GASES CONTAINING SOLUBLE COMPOUNDS

[75] Inventors: Claude Djololian, Maromme La Maine; Gerard LaGrange, Bois Buillaume, both of France

[73] Assignee: Rhone-Poulenc Industries, Paris, France

[21] Appl. No.: 115,134

[22] Filed: Jan. 24, 1980

Related U.S. Application Data

[63] Continuation-in-part of Ser. No. 52,313, Jun. 26, 1979, abandoned, which is a continuation of Ser. No. 738,139, Nov. 2, 1976, abandoned.

[30] Foreign Application Priority Data

Nov. 4, 1975 [FR] France ................ 75 33658

[51] Int. Cl.$^3$ ............................................. B01D 47/06
[52] U.S. Cl. .................................... 55/238; 55/257 R; 261/79 A; 261/112; 422/170; 422/172; 423/210; 423/215.5; 423/238; 423/240; 423/242
[58] Field of Search ............... 423/210, 215.5, 238, 423/240, 242; 55/92, 238, 257 R, 235–237; 261/79 A, 112; 422/169, 170, 172, 176

[56] References Cited

U.S. PATENT DOCUMENTS

| | | | |
|---|---|---|---|
| 1,992,762 | 2/1935 | Pease | 55/92 |
| 2,114,786 | 4/1938 | Schneible | 261/79 A |
| 2,409,088 | 10/1946 | Weits et al. | 261/79 A X |
| 2,808,897 | 10/1957 | Reinsch et al. | 261/79 A |
| 3,119,675 | 1/1964 | Gallagher | 261/112 X |
| 3,128,320 | 4/1964 | Umbricht | 261/79 A X |
| 3,233,882 | 2/1966 | Calaceto | 261/79 A X |
| 3,779,526 | 12/1973 | Tanigawa | 55/257 PP |
| 3,862,827 | 1/1975 | Miczek | 55/238 |
| 3,990,870 | 11/1976 | Miczek | 261/79 A X |

FOREIGN PATENT DOCUMENTS 37094 10/1974 France .

OTHER PUBLICATIONS

Perry, "Chemical Engineers' Handbook", McGraw Hill Book Co., N.Y., 5th Ed., pp. 20-99.

Primary Examiner—Earl C. Thomas
Attorney, Agent, or Firm—Burns, Doane, Swecker & Mathis

[57] ABSTRACT

A column-type apparatus for treatment of a gas stream with liquid includes a gas inlet for introducing a gas stream containing soluble compounds and solid particles into the apparatus and simultaneously imparting a cyclonic and upward flow to the gas stream. A gas-liquid mixing section above the gas inlet contains a liquid dispersing device from which liquid is vertically dispersed from the upper portion of the gas-liquid mixing section and flows downwardly and counter-currently to the gas flow wherein all the material entrained within the gas stream is completely and intimately contacted with the liquid. In a gas-liquid separating section above the mixing section, the cyclonic and upward flow of the gas stream causes separation of vesicles formed in the mixing section and solid particles entrained therein by centrifuging and impinging the vesicles onto the interior wall of the column, causing the vesicles to coalesce and form a continuous and downwardly flowing film of liquid on the interior wall of the column, which collects in a liquid collection section. The thus treated gas, free of soluble compounds and solid particles, flows through a gas outlet section. The apparatus is useful in any process involving gaseous streams containing soluble compounds, and particularly for absorptions involving chemical reactions or requiring less than a theoretical plate.

17 Claims, 15 Drawing Figures

METHOD AND APPARATUS FOR THE TREATMENT OF GASES CONTAINING SOLUBLE COMPOUNDS

CROSS-REFERENCE TO RELATED APPLICATION:

This application is a continuation-in-part of application Ser. No. 52,313, filed June 26, 1979 and now abandoned; which is a continuation of application Ser. No. 738,139, filed Nov. 2, 1976 and now abandoned; both of which are hereby expressly incorporated in their entireties.

BACKGROUND OF THE INVENTION

1. Field of the Invention

This invention relates to a cyclonic gas treatment method and apparatus to remove liquid and solid particles entrained in a gas stream.

More particularly, this invention relates to a gas treatment method and apparatus to remove liquid soluble gaseous compounds and solid particles entrained in the gas stream.

2. Description of the Prior Art

In the prior art, gas treatment systems are known which employ means to impart a cyclonic swirl to the gas being treated. This component of velocity results in the heavier particles moving to the outside of the gas stream where they are more readily intercepted and removed. Other types of apparatus involve gas-scrubbers in which the flowing gas is intercepted by a high energy stream of liquid. This action imparts a new component of velocity to the particles entrained in the gas due to collision thereof by particles of liquid and adds to the mass of particles entrained in the gas by hydrostatic action, thereby increasing the tendency for particles to move out of the flowing gas stream. The liquid spray or sprays of these apparatuses are delivered to the gas stream from rotating spray heads or flat spray diffusers. The disadvantage of these apparatuses is liquid spray may be delivered in so fine a state of atomization that normally at least the major portion of the spray, if vaporizable, would be completely dissipated in the surrounding gas and its initial momentum overcome within a short distance from its point of delivery. A spray in such a fine state of atomization will necessarily promote the most intimate contact between liquid and finely divided solid particles or vesicles (liquid particles in suspension). Such methods, however, due to the small droplet size and gas velocities used, are plagued with the formation of vesicular residues. These vesicular residues require an additional purification apparatus. Another of the disadvantages of these prior art systems is that the particles moving to the outside of the gas stream sometimes have a tendency to re-enter the gas stream to once again be entrained therein.

A still more vexing problem exists with absorptions accompanied with chemical reactions. Generally the absorption problem is resolved by using columns with plates or linings but when the absorption is accompanied by a chemical reaction which may produce residues and when the technique requires less than a theoretical plate, empty columns are preferred. However, in empty columns of the simple counter-flow type, the absorption is insufficient in relation to the size of the device. The design of these systems requires a series of apparatuses of large volume.

Therefore, there exists a need for a gas treating apparatus and a method therefor which is economical, efficient and removes vesicular residues without the need for additional purification apparatus and in a compact system.

It is therefore an object of the present invention to provide a novel, highly efficient apparatus for removing liquid, soluble gaeous compounds and solid particles entrained in a gas stream.

Another object of this invention is to provide an apparatus for the treatment of gases in which gas treatment and cyclonic separation are combined concurrently in a single highly efficient unit.

SUMMARY OF THE INVENTION

These, as well as other objects and advantages of the present invention, are achieved by providing an apparatus for intermixing a gas stream and a liquid, for interaction between the gas and the liquid and thereafter separating the gas from the liquid, which includes a cyclindrical vertically disposed column having an inner cyclindrical wall, a bottom wall and a top wall. The bottom wall forms a liquid collecting zone disposed at the lower end portion of the column and has a liquid outlet means in communication therewith. A gas inlet means is disposed in the column above the liquid collecting means for introducing a gas stream and imparting a cyclonic flow to the gas stream. A gas-liquid mixing section in the column, having liquid dispersing means disposed at the upper end portion thereof, provides for a liquid stream to be vertically dispersed counter-currently to the upward flow of the cyclonic gas stream, and become intermixed and interact therewith. A gas-liquid separating section within the column above the mixing section and in fluid communication therewith contains a flat ring baffle, or collar, at the upper end portion thereof. A gas discharge zone is disposed in the column above the separating section and in gaseous communication therewith, and contains gas outlet means.

BRIEF DESCRIPTION OF THE DRAWINGS

The invention will be described in connection with the annexed drawings wherein.

DESCRIPTION OF THE PREFERRED EMBODIMENTS

Figure 1:
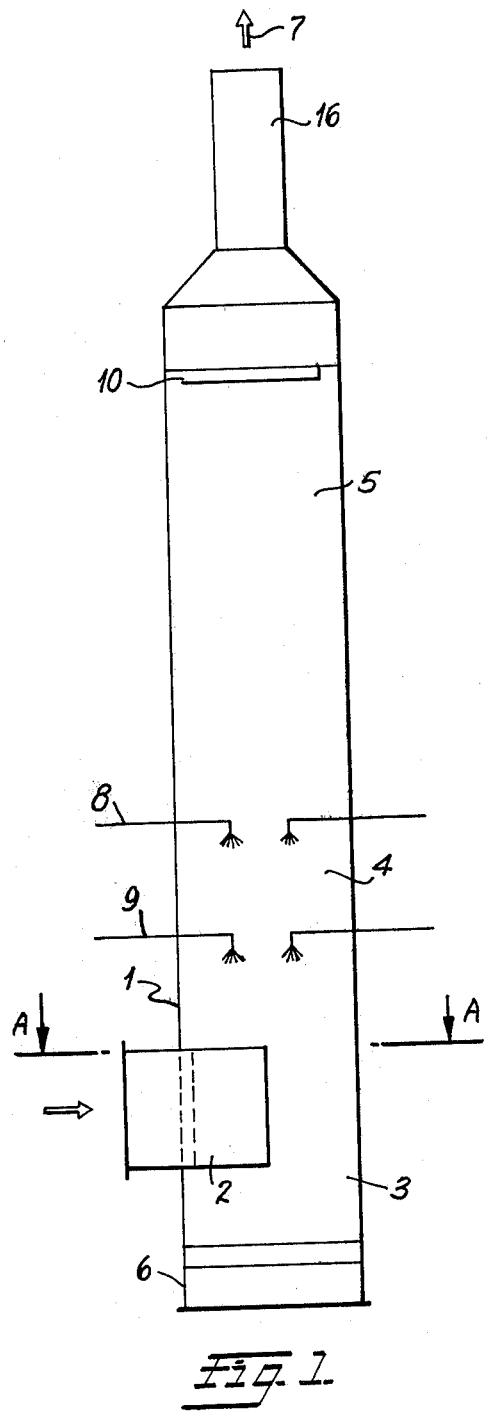
FIG. 1 is a cross-sectional view of a vertical cylindrical column constructed in accordance with this invention.

In accordance with one preferred form of apparatus embodying the invention, a vessel is provided through which the liquid and gas streams pass counter-currently, this vessel being preferably in the form of a generally cylindrical, vertically disposed column having a gas inlet section, a liquid collecting section at its bottom end portion in which the liquid introduced in the column by liquid dispersing means ultimately collects for discharge from the column and from which it is preferably recycled to the liquid dispersing means in a liquid-gas intermixing or treatment section above the gas inlet section. The liquid dispersing means is disposed in the column in the upper portion of the mixing section through which liquid is introduced into the column. A separating section is disposed above the liquid distributor means, and a gas discharge section with a gas outlet means is disposed above the separating section. The gas discharge section is preferably separated from the separating section by a flat ring, or collar, attached to the ineer wall of the column at the top portion of the separating section.

Referring now to the drawings in which like reference characters indicate similar parts throughout the several views, the empty column 1 is generally cylindrical in shape and may be constructed of any suitable material such as steel or other construction metals or of plastic materials such as reinforced polyester, epoxy or furan resins, or other corrosion resistant materials. It will be appreciated that the selection of the material will depend primarily on the purpose of the apparatus and its ultimate use.

In the apparatus illustrated in FIG. 1, the lower portion of the column is connected to a conduit for the introduction of gas through the gas inlet means 2. The gas inlet means 2 and a gas outlet means 7 are positioned at opposite ends of the column 1. The gas inlet means 2 is tangential to the interior of the column 1 to impart a generally helical flow to the gas stream. The gas stream entering the gas inlet means 2 at a suitably high pressure will pass into the gas inlet section 3 and swirl upwardly in a generally helical path until it emerges from the gas outlet means 7. This gas outlet means may allow the gas to exit in either an axial or a tangential direction.

The lower end portion of the gas inlet section is connected to a liquid collecting section 6 which can have any conventional configuration. For example, the collection section 6 may be comprised of truncated cones, or the like, which may be fitted with an axial or tangential liquid outlet means or a by-pass line in order that the liquid may be recirculated to the mixing section. The liquid collection section 6 can also be equipped with an overflow means or regulating device. It is also advantageous to provide the liquid collection section with an anti-turbulence device such as baffle plates, cross plates or square grid bases.

A plurality of liquid dispersing means 8 and 9 are mounted coextensive with the column in the gas-liquid intermixing or treatment section 4. The liquid dispersing means 8 and 9 are positioned to direct the liquid stream passing through them so that they direct vertical spray diffused liquid throughout the volume of the mixing section 4. The vertical spray diffusion of the liquid can be accomplished by spray devices, such as a full cone spray diffuser, flat spray diffusers or by any conventional means to effect the liquid spray throughput the gas-liquid intermixing section.

The pressure of the sprayed liquid stream supplied to the mixing section 4 may be regulated independently in each portion of the mixing section 4. The pressure is chosen so as to attain the desired degree of dispersion and to provide a large surface area for absorption or reaction without entraining the vesicles (liquid particles suspended or entrained in the gas stream) and solid particles in the gas stream and blowing them through the system, as well as avoiding the impairment or destruction of cyclonic flow. The pressure of the sprayed liquid stream is regulated principally as a function of its physical properties, the velocity of the gas treated, the composition of the gas treated, the partial pressures of the components of the gas treated and the size of the droplets of liquid desired. Generally, pressures in the range of between 0.1 and 3 bar are employed.

The gas stream cyclonically flowing upwardly through the column will meet and come in contact with the liquid diffused by the liquid dispersing means 8 and 9 in a counter-current direction. All material entrained within the gas stream must encounter at least one or more radiating sheets of liquid spray before emerging from the mixing section 4 into the gas-liquid separating section 5. The gas stream, now free of soluble compounds, can still contain vesicles. The swirling or cyclonic motion of the gas is sufficient to eject by centrifugal force the vesicles to impinge and to adhere to the interior vertical walls of the column to coalesce and to form a continuously and downwardly flowing liquid film or sheet on the interior vertical wall of the separating section 5. The liquid will flow downwardly along the wall and form a pool or reservoir in the liquid collection section 6.

A collar device 10, preferably in the shape of a ring-like plate, is rigid in nature. The outer circular edge of the plate is attached to the inner wall and is perpendicular to the axis of the column and prevents the liquid film on the interior walls of the column from flowing upward beyond the ring into the gas outlet section 16. Other particles of sufficient mass, density and size, which do not have the requisite inertia, will reverse their direction of flow prior to reaching the collar 10 and will fall to the surface of the liquid reservoir of the liquid collection section 6 and will be removed from the pool and be suitably discarded. Preferably, as stated hereinbefore, the liquid from the pool can be recycled, with or without further treatment, through the liquid distributor means. Concurrently, the treated gas, free of soluble gaseous compounds and solid particles and vesicules, passes through the axial exit section 16 and is discharged through the outlet means 7.

Figure 2:
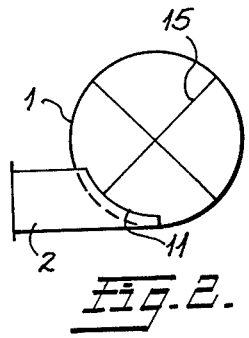
FIG. 2 is a sectional view taken along plane AA of FIG. 1.

A preferred embodiment of a gas inlet means is illustrated in FIG. 2. In this embodiment the gas inlet means 2 is rectangular in cross-section and is placed tangentially to the column 1. At the intersection of the upper part of the gas inlet means with the column wall, a flat part 11 of the gas inlet means, cut in a curve projecting inwardly into the collumn, provides protection for the gaseous stream from liquid formed on the wall of the column, as described hereinabove. In a further modification, the gas inlet means may also be provided with an anti-cyclone device 15.

Figure 3:
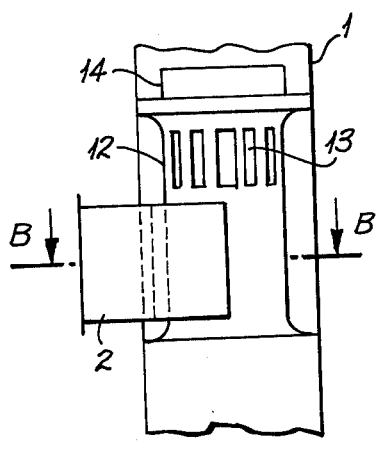
FIG. 3 is a vertical cross-sectional view of a lower portion of the cylindrical column showing a modified form of the gas inlet section.
Figure 4:
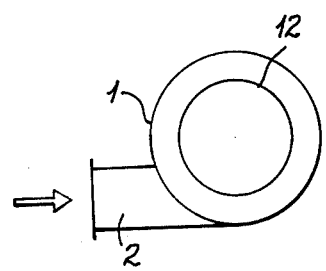
FIG. 4 is a horizontal cross-sectional view along plane BB of FIG. 3 showing the preferred gas inlet means.

Another modification of the gas inlet means 2, shown in FIGS. 3 and 4, can be provided in order to efficiently distribute the inlet gas stream. More particularly, as shown in FIG. 3, a vertical cylindrical tube 12 is attached to the inner wall of the column, positioned above and below the gas inlet means, and is provided with a plurality of apertures 13 to evenly diffuse the inlet gas stream. Above the upper coupling surface of the tube 12 is located a ring-shaped reservoir 14 which is provided with a means (not shown) for evacuation of the collected liquids.

Figure 5:
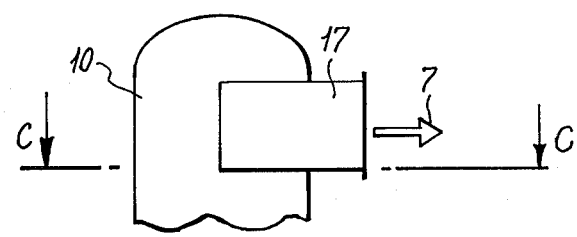
FIG. 5 is a vertical plan view showing a modification of the gas exit means having a rectangular-section conduit mounted tangentially to the column.
Figure 6:
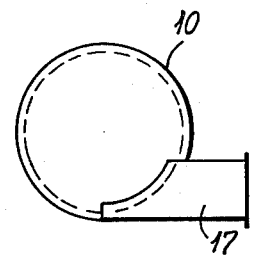
FIG. 6 is a horizontal cross-sectional view of the gas exit section along the plane CC of FIG. 5.

In FIG. 5, a modification of the gas outlet means 7 is shown which is in all respects similar to that illustration in FIG. 1 except that the gas outlet means is effected by an outlet 17 of rectangular-section mounted tangentially on the column. FIG. 6 illustrates a cross-sectional view of this modification, on a horizontal plane CC, showing the lower part of tangential exit conduit 17 projecting inwardly beyond the ring collar 10.

Figure 7:
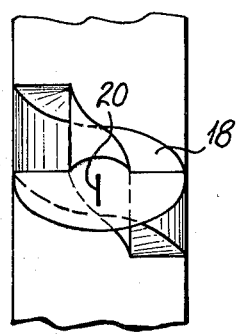
FIG. 7 is a cross-sectional view, from the direction D of FIG. 8, of the gas exit section and the sealing element 18 with an anti-cyclone device 20.

In one preferred embodiment of the present invention, two or more of the above described apparatuses can be connected axially in series, wherein the second column is above the first, i.e., the cyclonic gas stream exits one column and enters the inlet of another. The separate collection of liquids from each column can be provided. In this preferred embodiment, a further modification of the gas outlet means 7 is exemplified in FIG. 7, which shows a sealing element 18 and an anti-cyclone device 20. Referring to FIG. 7, the sealing element 18 allows the cyclonic flow of the treated gases to pass through the circumferential gas outlet of the lower column while at the same time preventing the upward passage of liquids in the film on the column wall at the top of the separating section. This embodiment of course may be applied without additional columns and the purified gases may be passed for further processing or they may be vented.

Figure 8:
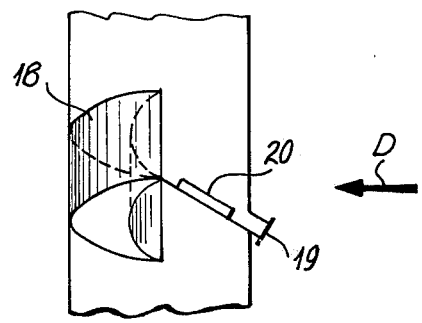
FIG. 8 is a view from a direction perpendicular to direction D of the sealing element 18 with exit zone 19 and anti-cyclone device 20.

FIG. 8 illustrates another view of the modification of the gas outlet means illustrated in FIG. 7. In this Figure, the sealing element 18 is viewed from a direction perpendicular to the arrow D and is provided with a liquid exit element 19 and an anti-cyclone device 20.

Figure 9:
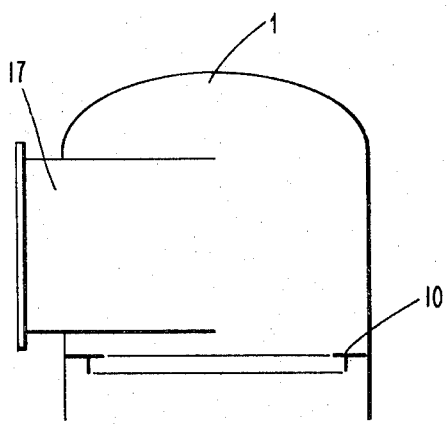
FIGS. 9–11 are cross-sectional illustrations of preferred embodiments of the collar 10.
Figure 9A:
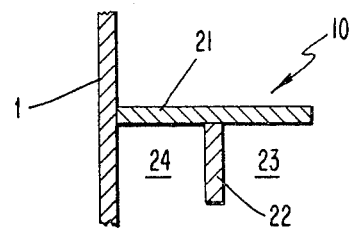

A preferred embodiment of a collar 10 for preventing upward flow of liquid beyond the gas-liquid separation section is illustrated in general in FIG. 9 and in detail in cross-sectional view in FIG. 9A. The collar comprises an annular ring 21, the outer peripheral edge of which is attached to the inner surface of the column 1 at the top of the gas-liquid separation zone. A vertically disposed cylindrical wall 22 depends from the underside of the ring 21. The wall 22 is recessed from the inner edge of the ring 21, i.e., the inside diameter of the wall 22 is greater than the inside diameter of the ring 21, to thereby divide the space below the ring 21 into two areas 23 and 24. In the radially innermost area 23 the gas flowing out of the column 1 is at a high velocity. Due to the presence of the wall 22, the liquid which rises on the inner surface of the liquid film formed on the wall of the column 1 is prevented from being swept across the underside of the ring 21 and out of the outlet portion of the column by the high velocity gas flow. Rather, this liquid collects within the radially outermost area 24 until droplets form and drop to the bottom of the column. In operation, these droplets are likely to drip from the bottom surface of the cylindrical wall 22.

Figure 10:
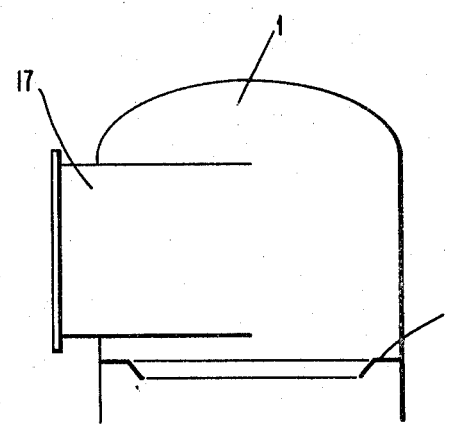
Figure 10A:
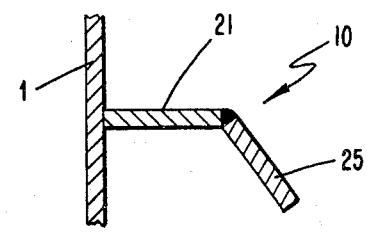

A modified collar 10 is illustrated in general in FIG. 10 and in cross-sectional detail in FIG. 10A. This modified embodiment also includes a annular ring 21 for physically halting the upward flow of liquid along the wall of the column 1. The collar 10 further includes an angularly disposed annular flange 25 for shielding liquid on the underside of the ring 21 from the high-velocity gas flow, and thereby preventing the liquid from ascending beyond the gas-liquid separation zone.

Figure 11:
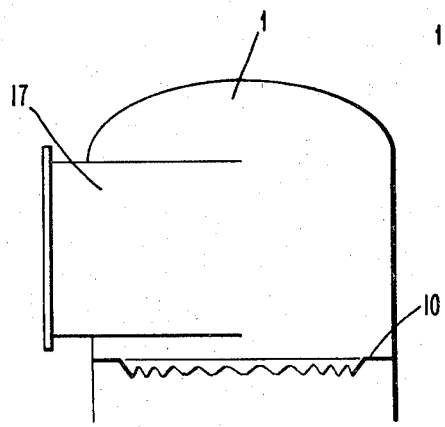
Figure 11A:
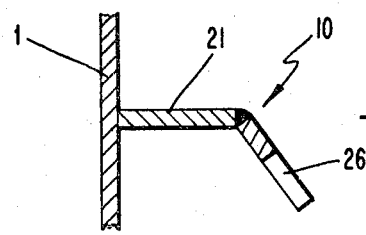
Figure 11B:
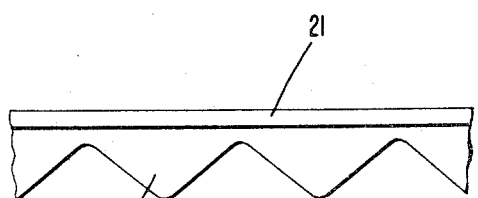

A further modification of a collar 10 is illustrated in general in FIG. 11, in cross-sectional detail in FIG. 11A, and in a sectional plan view in FIG. 11B. This modified embodiment includes an annular ring 21 and an angularly disposed annular flange 26, the innermost edge of which is corrugated. The corrugated inner edge of the flange 26 offers decreased resistance to the axial flow of the gas while shielding the liquid therefrom.

The invention will now be described with reference to specific examples thereof.

EXAMPLE I

A gaseous mixture resulting from the manufacture of sodium tripolyphosphate comprising 36 kg. of fluorohydric acid and 5,033 kg. of a mixture consisting of carbon dioxide and sulfur dioxide is introduced into a column, such as that illustrated in FIG. 1, at a flow rate of 141,658 kg. per hour. The mixture is treated by spray diffusion in two sprinkling layers at a rate of 160 m$^3$ per hour by recycling a sodium hydroxide solution containing 72 kg. of sodium, maintained at a pH of 6.7 and a temperature of 80° C. The treated gases passing through the axial gas outlet means of the column contain less than 10 mg of gaseous fluorine per m$^3$, with a pressure drop of 100 mm water column. It was observed that there are no deposits on the inner walls of the column.

EXAMPLE II

In a column, such as that illustrated in FIG. 1, a gaseous mixture derived from the cooling air from a reaction vessel in a process for preparing phosphoric acid, having a temperature of 62° C. and containing 260 mg/m$^3$ of fluorine in the form of HF and SiF$_4$, is treated with a throughput rate of 35,000 m$^3$/h. The gas exiting the outlet of such a purifying system, has a fluorine content of 18 mg/m$^3$.

The gas stream to be treated according to the practice of the present invention generally contains both liquid soluble compounds and solid particles. It is particularly useful in the purification of gaseous mixtures containing soluble gaseous compounds which are removed from the gas stream by liquid absorption techniques. It is more particularly useful with those absorptions accompanied with chemical reaction or those requiring less than a theoretcial plate. A theoretical plate is generally defined as a perfect exchange element wherein fluids leaving the element are in thermodynamic equilibrium. ("Les procedes de rectification dans l'industrie chemique", A. Paris, ed Dunod). McGraw Hill Book Co., 4 ed., 1973, chap. 13.

The gases which can be treated in a cyclonic column such as that disclosed herein include all soluble gases, such as, for example, HF, SiF$_4$, NH$_3$, SO$_2$, SO$_3$, CO$_2$ and the like. Among the main applications, the following are cited as exemplary:

(1) The purification of cooling gases from a reaction vessel of a process for preparing phosphoric acid, wherein phosphate dust, acid droplets (phosphoric acid), HF, SiF$_4$, SO$_2$, CO$_2$ and water vapor can be removed from the gaseous stream;

(2) The purification of gases derived from the calcination of tripolyphosphate, including the removal of tripolyphosphate dust, HF, SiF$_4$, SO$_2$, CO$_2$ and calories; and (3) The purification of gases obtained in the course of the decontamination of plants for fertilizer production by removing dust, NH₃, and fluorine, for example.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In an apparatus for first treating a gas stream with a liquid and thereafter separating the gas from the liquid, said apparatus comprising a cylindrical vertically disposed column; a liquid collecting reservoir disposed at the lower end portion of said column having a liquid outlet means in fluid communication therewith; a gas inlet means disposed in said column above said reservoir and in fluid communication therewith, for introducing a gas stream and imparting a cyclonic and upward flow to said gas stream; a treatment section disposed in said column for contacting said gas and said liquid and having liquid dispersing means at the upper end portion of said treatment section for dispersing liquid counter-currently to the upward flow of said cyclonic gas stream, to thereby cause vesicles to form; a gas-liquid separating section within said column above said treatment section in fluid communication therewith, ; means at the top end portion of said separating section for physically preventing the ascension of liquid beyond said separation section, and a gas outlet section disposed in said column above said separating section and in gaseous communication therewith, having a gas outlet means for discharging gas therefrom, the improvement wherein said separating section consists of an empty section of a cylindrical column that is devoid of any internal structure, wherein the cyclonic flow of the gas stream is uninterrupted and causes the vesicles to impinge, adhere and coalesce on the inner wall of the column to form a continuous sheet or film of liquid downwardly flowing on said inner wall to said liquid collection reservoir.

2. The apparatus according to claim 1, wherein said liquid dispersing means is a full cone spray diffuser.

3. The apparatus according to claim 11, wherein said liquid dispersing means are flat spray diffusers.

4. The apparatus according to claim 1, wherein said liquid dispersing means comprises a plurality of spray diffusers arranged in a manner that the liquid spray occupies all of said treatment section.

5. The apparatus according to claim 4, wherein the pressures of said spray diffusers are independently regulated to pressures between 0.1 and 3 bar.

6. The apparatus according to claim 1, wherein said preventing means includes an annular ring attached to the inner wall of said column.

7. The apparatus of claim 6 further including a vertically disposed cylindrical wall depending from the underside of said ring.

8. The apparatus of claim 7, wherein said wall is outwardly recessed from the inner edge of said ring.

9. The apparatus of claim 6 further including an angularly disposed annular flange downwardly depending from said ring.

10. The apparatus of claim 9, wherein the inner edge of said flange is corrugated.

11. The apparatus according to claim 1, further including means for recycling liquid from said collecting section to said liquid dispersing means.

12. The apparatus according to claim 1, wherein said inlet gas means comprises a rectangular conduit placed tangentially to said column, whose intersection with the inner wall of said column has a flat part projecting inwardly to protect against the downwardly flowing liquid on said inner wall.

13. The apparatus according to claim 12, wherein said gas inlet means comprises a vertical cylindrical tube provided with a plurality of apertures and protected from the downwardly flowing liquid by means of a ring-shaped reservoir.

14. The apparatus according to claim 1, wherein said gas outlet means is arranged axially to said column.

15. The apparatus according to claim 1, wherein said gas outlet means is arranged tangentially to said column.

16. The apparatus according to claim 1, wherein at least one of said gas outlet means and said preventing means comprises a sealing element which stops, collects and evacuates liquids from said column without disturbing the cyclonic flow of the gas.

17. The apparatus according to claim 16, further including a second treatment apparatus connected axially in series thereto, wherein the liquids are collected separately at the liquid collecting section of each apparatus, and a gas free of soluble compounds is discharged.

* * * * *